(12) United States Patent
Schober et al.

(10) Patent No.: US 9,285,249 B2
(45) Date of Patent: Mar. 15, 2016

(54) ATOMIC SENSOR PHYSICS PACKAGE WITH METAL FRAME

(71) Applicant: HONEYWELL INTL. INC., Morristown, NJ (US)

(72) Inventors: Christina Marie Schober, St. Anthony, MN (US); Jennifer S. Strabley, Maple Grove, MN (US); James A. Vescera, Hopkins, MN (US); Kenneth Salit, Plymouth, MN (US); Delmer L. Smith, Edina, MN (US); Terry Dean Stark, St. Louis Park, MN (US); Chad Langness, Robbinsdale, MN (US); Karl D. Nelson, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 734 days.

(21) Appl. No.: 13/644,618

(22) Filed: Oct. 4, 2012

(65) Prior Publication Data

US 2014/0096607 A1    Apr. 10, 2014

(51) Int. Cl.
*G01D 11/24*    (2006.01)
*G04F 5/14*    (2006.01)

(52) U.S. Cl.
CPC ............... *G01D 11/245* (2013.01); *G04F 5/14* (2013.01); *Y10T 29/49826* (2015.01); *Y10T 29/49885* (2015.01)

(58) Field of Classification Search
CPC ................................. G01D 11/245; G04F 5/14
USPC .................................................... 331/94.1, 68
See application file for complete search history.

(56) References Cited

U.S. PATENT DOCUMENTS

| 4,817,112 A | 3/1989 | Weber et al. |
| 4,983,844 A | 1/1991 | Korevaar |
| 5,010,251 A | 4/1991 | Grinberg et al. |

(Continued)

FOREIGN PATENT DOCUMENTS

| DE | 3830149 | 3/1990 |
| EP | 2154585 | 2/2010 |

(Continued)

OTHER PUBLICATIONS

U.S. Patent and Trademark Office, "Office Action", "U.S. Appl. No. 13/362,286", Aug. 16, 2013, pp. 1-23.

(Continued)

*Primary Examiner* — Joseph Chang
(74) *Attorney, Agent, or Firm* — Fogg & Powers LLC

(57) ABSTRACT

One embodiment is directed towards a physics package of an atomic sensor. The physics package includes a frame composed of metal and including a plurality of slender support members extending between one another in a three dimensional structure. The support members define boundaries between adjacent apertures defined in the frame. The plurality of support members include a plurality of mounting surfaces adjacent to the apertures. The physics package also includes a plurality of panes attached to the mounting surfaces of the frame. The plurality of panes cover the apertures such that the frame and the plurality of panes define a vacuum chamber and provide three light paths that cross within the vacuum chamber at 90 degree angles with respect to one another. The physics package also includes a chamber evacuation structure for evacuating the vacuum chamber.

20 Claims, 5 Drawing Sheets

(56) References Cited

U.S. PATENT DOCUMENTS

| | | | |
|---|---|---|---|
| 5,058,124 | A | 10/1991 | Cameron et al. |
| 5,327,105 | A | 7/1994 | Liberman et al. |
| 5,528,028 | A | 6/1996 | Chu et al. |
| 5,594,843 | A | 1/1997 | O'Neill |
| 6,215,366 | B1 | 4/2001 | Kern et al. |
| 6,303,928 | B1 | 10/2001 | Buell et al. |
| 6,406,578 | B1 | 6/2002 | Schober et al. |
| 6,570,459 | B1 | 5/2003 | Nathanson et al. |
| 6,772,630 | B2 | 8/2004 | Araya |
| 6,837,075 | B1 | 1/2005 | Snowdon et al. |
| 6,895,164 | B2 | 5/2005 | Saccomanno |
| 6,900,702 | B2 | 5/2005 | Youngner et al. |
| 7,323,941 | B1 | 1/2008 | Happer et al. |
| 7,379,486 | B2 | 5/2008 | Lust et al. |
| 7,446,618 | B2 | 11/2008 | Koyama |
| 7,468,637 | B2 | 12/2008 | Braun et al. |
| 7,549,866 | B2 | 6/2009 | Cohen et al. |
| 7,619,485 | B2 | 11/2009 | DeNatale et al. |
| 7,707,891 | B2 | 5/2010 | Antila et al. |
| 7,944,317 | B2 | 5/2011 | Strabley |
| 7,965,147 | B2 | 6/2011 | Strabley et al. |
| 8,071,019 | B2 | 12/2011 | Touchberry et al. |
| 2004/0040658 | A1 | 3/2004 | Usui et al. |
| 2006/0022761 | A1 | 2/2006 | Abeles et al. |
| 2006/0051883 | A1* | 3/2006 | Mescher et al. ............. 438/5 |
| 2006/0220524 | A1 | 10/2006 | Jeon et al. |
| 2007/0034809 | A1 | 2/2007 | Lal et al. |
| 2007/0200643 | A1 | 8/2007 | Dimarcq et al. |
| 2008/0267232 | A1 | 10/2008 | DeNatale |
| 2010/0033256 | A1 | 2/2010 | Strabley et al. |
| 2010/0102893 | A1 | 4/2010 | Chindo et al. |
| 2010/0111750 | A1 | 5/2010 | Touchberry et al. |
| 2010/0188661 | A1 | 7/2010 | Cole |
| 2011/0013179 | A1 | 1/2011 | Meijer et al. |
| 2013/0194046 | A1 | 8/2013 | Schober et al. |
| 2015/0022816 | A1 | 1/2015 | Schober et al. |

FOREIGN PATENT DOCUMENTS

| | | |
|---|---|---|
| JP | 61144613 | 2/1986 |
| WO | 2009025893 | 2/2009 |

OTHER PUBLICATIONS

US. Patent Office, "Office Action for U.S. Appl. No. 13/947,633", Jan. 22, 2015, pp. 1-46, Published in: US.

Schober et al., "Systems and Methods for External Frit Mounted Components", "U.S. Appl. No. 13/362,286, filed Jan. 31, 2012", , pp. 1-22.

European Patent Office, "Communication under Rule 71(3) EPC", "from Foreign Counterpart of U.S. Appl. No. 12/484,878", Jul. 2, 2012, pp. 1-8.

European Patent Office, "European Search Report", "from Foreign Counterpart of U.S. Appl. No. 12/484,878", mailed Dec. 17, 2010, pp. 13, Published in: EP.

U.S. Patent and Trademark Office, "Notice of Allowance", "U.S. Appl. No. 12/484,878", Apr. 8, 2011, pp. 1-18.

Iga et al., "Stacked Planar Optics: an Application of the Planar Microlens", "Applied Optics", Oct. 1, 1982, pp. 3456-3460, vol. 21, No. 19.

Kitching, "Time for a Better Receiver: Chip-Scale Atomic Frequency References", "GPS World", Nov. 2007, pp. 1-6.

Knappe, "A microfabricated atomic clock", "Applied Physics Letters", Aug. 30, 2004, pp. 1460-1462, vol. 85, No. 9, Publisher: American Institute of Physics.

Oikawa et al., "Optical Tap Array Using Distributed-Index Planar Microlens", "Electronics Letters", Apr. 15, 1982, pp. 316-317, vol. 18, No. 8.

Schober et al., "Systems and Methods for Gettering an Atomic Sensor", "U.S. Appl. No. 13/231,438", filed Sep. 13, 2011, pp. 1-17.

United States Patent and Trademark Office, "Notice of Allowance", "Notice of Allowance from U.S. Appl. No. 13/362,286", Jun. 13, 2014, Published in: US.

Japanese Patent Office, "Notice of Allowance from JP Application No. 2009-184461 mailed Apr. 16, 2014", from Foreign Counterpart of U.S. Appl. No. 12/484,878, Apr. 16, 2014, pp. 14, Published in: JP.

European Patent Office, "European Office Action for Application Serial No. 14167394.7", "from Foreign Counterpart U.S. Appl. No. 13/947,633", Mar. 10, 2015, pp. 17, Published in: EP.

Nelson et al., "Cold Atom Micro Primary Standard (CAMPS)", "IEEE/ION Position Location and Navigation Symposium (PLANS)", Apr. 23, 2012, pp. 1094-1098, Publisher: IEEE.

Japanese Patent Office, "Office Action from JP Application No. 2009-184461 mailed Jan. 6, 2014", "from Foreign Counterpart of U.S. Appl. No. 12/484,878", Jan. 6, 2014, pp. 1-4, Published in: JP.

U.S. Patent and Trademark Office, "Office Action", "from U.S. Appl. No. 13/362,286", Dec. 19, 2013, pp. 1-12, Published in: US.

Ben-Aroya et al., "A CPT-Based Rb Atomic Clock Employing a Small Spherical Glass Vapor Cell", "38th Annual Precise Time and Time Interval Meeting", Jul. 2007, pp. 259-270.

Knappe et al., "Microfabricated Atomic Clocks and Magnetometers", "Journal of Optics A: Pure and Applied Optics", May 2006, pp. S318-S322.

Knappe et al., "Advances in Chip-Scale Atomic Frequency References at NIST", "Proc. of SPIE ", 2007, pp. 110, vol. 6673.

Kohel et al., "Quantum Gravity Gradiometer Development for Space", "http://esto.nasa.gov/conferences/ESTC2006/papers/b4p1.pdf", Jun. 28, 2006, pp. 1-7.

Sander et al., "Magnetoencephalography with a Chip-Scale Atomic Magnetometer", "Biomedical Optics Express", Apr. 2012, pp. 981-990, vol. 3, No. 5.

European Patent Office, "Office Action", "from Foreign Counterpart of U.S. Appl. No. 13/362,286", May 7, 2013, pp. 15, Published in: EP.

European Patent Office, "European Search Report", "from Foreign Counterpart of U.S. Appl. No. 13/362,286", Apr. 18, 2013, pp. 1-3, Published in: EP.

Shober et al., "Systems and Methods for External Frit Mounted Components", "U.S. Appl. No. 13/362,286,", Jan. 31, 2012, pp. 1-22.

Japanese Patent Office, "Office Action", "from Foreign Counterpart of U.S. Appl. No. 12/484,878", Sep. 6, 2013, pp. 1-6, Published in: JP.

U.S. Patent Office, "Office Action", "from U.S. Appl. No. 13/947,633", Jul. 22, 2015, pp. 1-19, Published in: US.

U.S. Patent and Trademark Office, "Notice of Allowance and Fee(s) Due", "U.S. Appl. No. 13/947,633", Dec. 3, 2015, pp. 1-11.

* cited by examiner

ATOMIC SENSOR PHYSICS PACKAGE WITH METAL FRAME

STATEMENT REGARDING FEDERALLY SPONSORED RESEARCH OR DEVELOPMENT

This invention was made with Government support under W31P4Q-09-C-0348 awarded by DARPA. The Government has certain rights in the invention.

BACKGROUND

Efforts are being made to reduce the size and packaging of atomic sensors, including atomic clocks and other sensors which utilize cold atom clouds as the sensing element. One way to accomplish this is to reduce the size of the physics package for the atomic sensor. One example of a physics package is a glass block that is machined and sealed to maintain an ultra-high vacuum. The glass block includes a plurality of faces on its exterior and a plurality of angled borings that serve as light paths to trap, cool, and manipulate the cold atomic sample. Mirrors and windows are fixedly attached over the exterior openings of the light path bores to seal the physics package. A cavity evacuation structure (e.g., pumping port) is attached to provide means for initial vacuum evacuation of the physics package. A sample reservoir (e.g., a reservoir for alkali material) is attached to hold the atomic sample used as the frequency reference for the atomic sensor. The sample reservoir is broken after vacuum processing, forming a background vapor. Atoms in the background vapor are cooled by the optical beams and trapped by magnetic fields in a configuration commonly called a magneto optical trap (MOT) or without the magnetic field, an optical molasses. In this configuration, the number of atoms collected into the MOT scales as the fourth power of the optical beam size used in the physics package. In the fundamental limit, the signal to noise of atomic sensors scale as the square root of the trapped atoms, lending a fundamental scaling on the sensor signal to noise and optical beam size. Developing a small volume physics package which allows for large optical beams and added-flexibility of a multi-beam configuration is critical to the development of high performance miniature atomic physics packages. Using multiple beam MOT configuration allow flexibility that a single beam configuration, such as a pyramid trap, does not allow. This flexibility is necessary to consider optical sensor or clocks which require optical pumping for precision state preparation, optical pulses for coherent atomic manipulation or atomic "beam splitters", or for reduction of optical scatter via the selective shuttering of optical beams.

SUMMARY

One embodiment is directed towards a physics package of an atomic sensor. The physics package includes a frame composed of metal and including a plurality of slender support members extending between one another in a three dimensional structure. The support members define boundaries between adjacent apertures defined in the frame. The plurality of support members include a plurality of mounting surfaces adjacent to the apertures. The physics package also includes a plurality of panes attached to the mounting surfaces of the frame. The plurality of panes cover the apertures such that the frame and the plurality of panes define a vacuum chamber and provide three light paths that cross within the vacuum chamber at 90 degree angles with respect to one another. The physics package also includes a chamber evacuation structure for evacuating the vacuum chamber.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
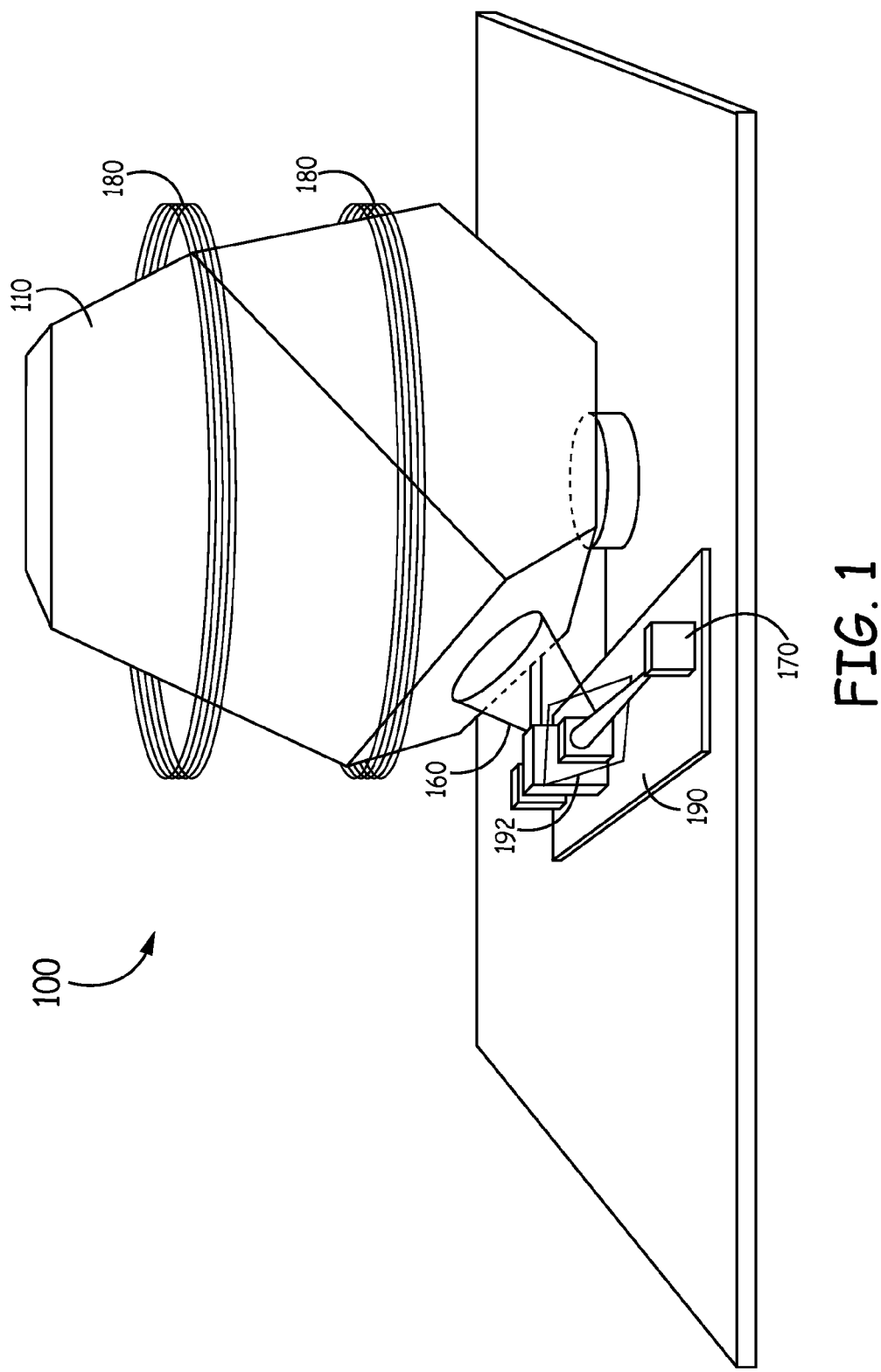
FIG. 1 is a perspective view of an example atomic sensor apparatus.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As the size of the glass block described above is further reduced, however, the glass can become too fragile to make multiple beam bores through the block, resulting in breakage, fractures, and/or chips when machining the bores in the glass block. For sensors using laser cooled atoms from a vapor, this issue is compounded by the desire to make the bore sizes as large as possible to accommodate large optical beams. The subject matter described herein can address these issues by providing a physics package composed of a metal frame defining a plurality of faces with panes of optically transparent material (e.g., glass) attached thereto. Such a physics package can have excellent strength while allowing for large optical beams, enabling the physics package to achieve a small size without compromising performance or operational flexibility.

FIG. 1 is a perspective view of an example atomic sensor apparatus 100. The sensor apparatus 100 is an atomic sensor, such as an accelerometer or atomic clock, including a physics package 110. As known to those skilled in the art, the atomic sensor 100 operates by preparing a sample of cold atoms with light beams from one or more lasers; cold atoms serve as the basis of the sensor. While cold atom sensors are used in this example, sensors using thermal atomic samples would also benefit from the physics package 110 described herein. In a case of a clock, the atomic energy levels are interrogated by optical or microwave fields to compare the frequency of an external oscillator to the atoms' internal energy levels. The physics package 100 defines a vacuum sealed chamber that holds the atoms that are interrogated. In an example, the atoms are alkali metal atoms, such as rubidium (e.g., Rb-78) or cesium and the vacuum sealed chamber is a passive vacuum with or without gettering agents. The physics package 110 described herein enables a plurality of light paths from different angles to intersect with the same volume within the physic package 110. The atoms (e.g., an atom cloud) within the physics package 110 are then trapped within that volume such that the plurality of light paths intersect with the atom cloud from different angles. Light beams from lasers can be propagated along the plurality of light paths to intersect with the atom cloud. These light beams can include light beams used to cool the atoms, and depending on the sensor operation, can include light beams used to interrogate or further manipulate the atoms.

The atomic sensor 100 can also include a micro-optical bench 190 that includes one or more laser light sources 170 for generating the light beams for cooling and/or interrogation of the atoms. As an example, the one or more laser light sources 170 can include a semiconductor laser such as a vertical cavity surface emitting laser (VCSEL), a distributed feedback laser, or an edge emitting laser. The micro-optical bench 190 can also include a micro-fabricated vapor cell 192 containing an alkali metal such as rubidium or cesium to provide absolute frequency stabilization of the laser 170, and a beam splitter for distributing a beam of light 160 to the vapor cell 192 and the physics package 110 and the vapor cell 192. The vapor cell 192 containing an alkali metal is used to frequency stabilize the beam of light 160 from the laser 170 to a predetermined atomic transition of the alkali metal. The atomic sensor 100 also includes a plurality of magnetic field coils 180 (two are shown in the example of FIG. 1), such as a Hemlholtz and anti-Helmholtz coils, for generating magnetic fields used for operation of the atomic sensor 100.

Embodiments of the atomic sensor 100 can also include a local oscillator, an antenna, and a photo-detector. In embodiments where the atomic sensor 100 is a microwave atomic clock, a microwave crystal oscillator can be used to generate a microwave signal at the clock atomic transition of the alkali metal. The antenna or similar structure (e.g., a waveguide) is used to deliver the microwave signal from the local oscillator to perform spectroscopy on the alkali metal atoms of the physics package 110. Photo-detectors are used for detecting the fluorescence of the alkali metal atom after the spectroscopy. This spectroscopy signal can be used to provide long term frequency stability to the microwave crystal oscillator.

Figure 2A:
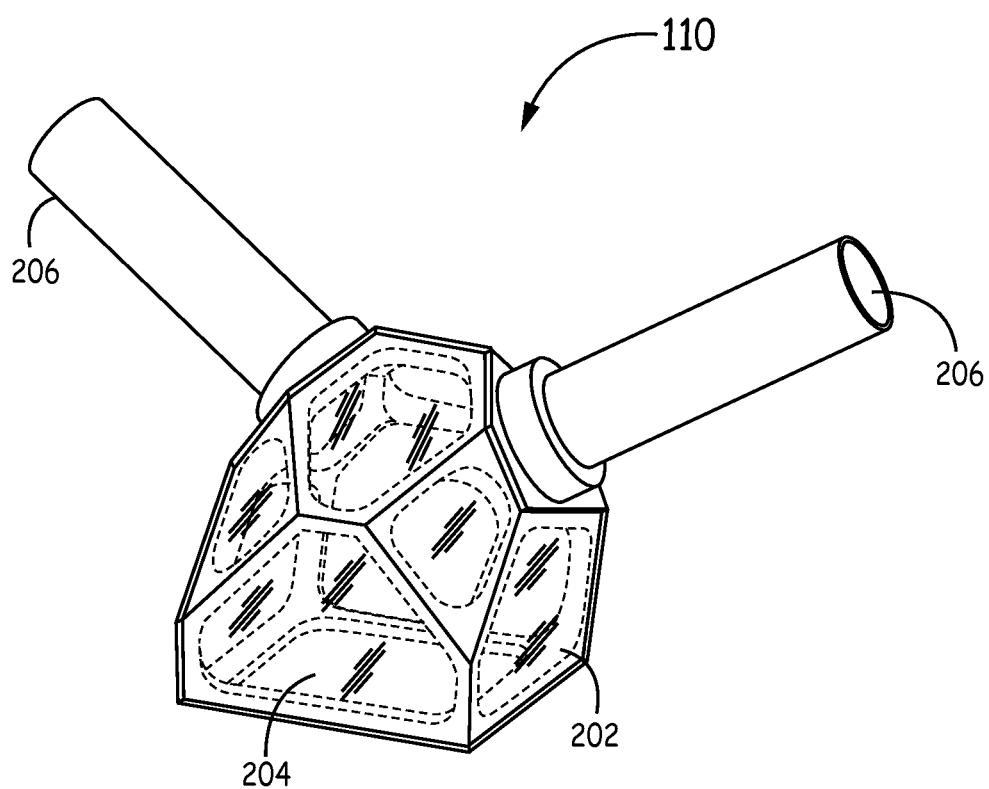
FIG. 2A is a perspective view of an example of a physics package of the atomic sensor apparatus of FIG. 1.
Figure 2B:
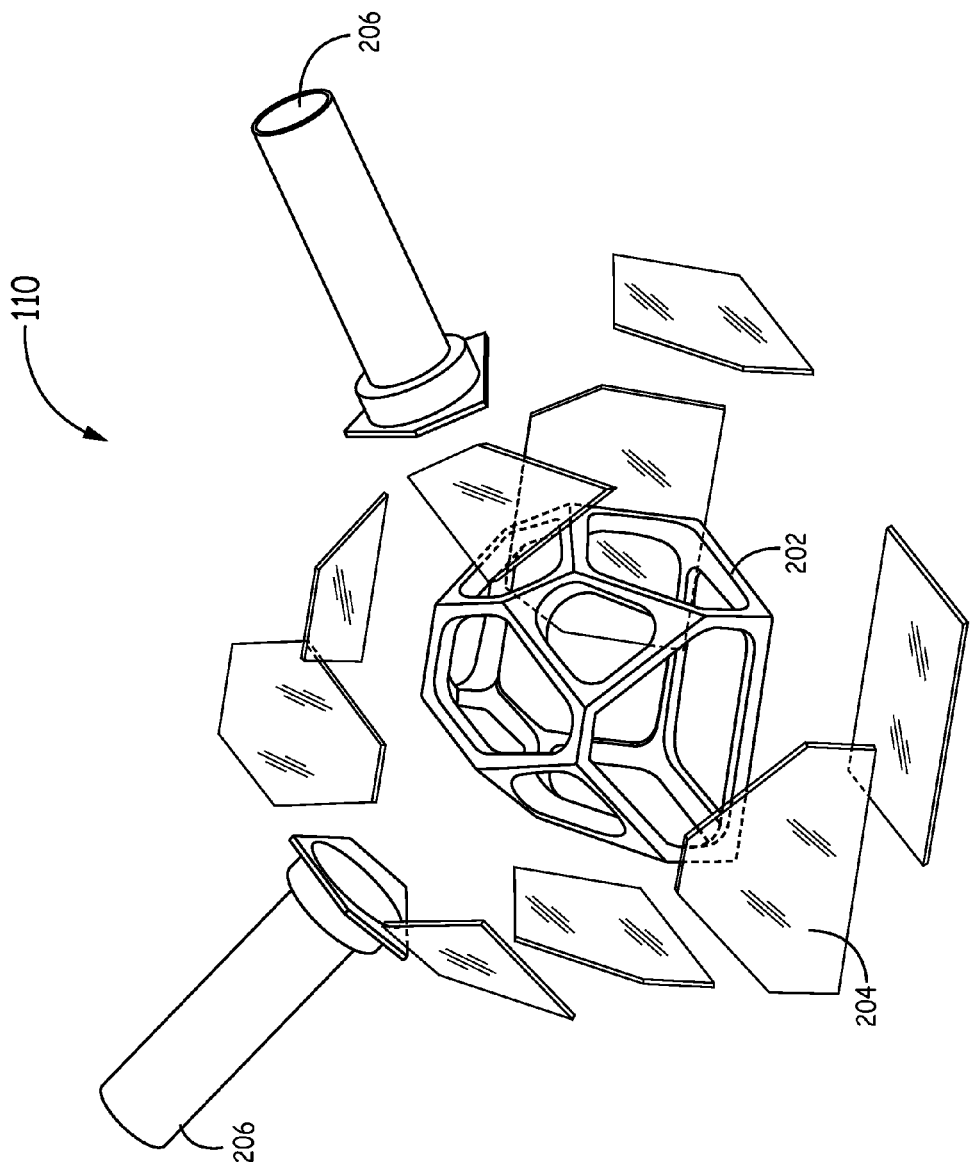
FIG. 2B is an exploded view of an example of a physics package of the atomic sensor apparatus of FIG. 1.
Figure 3:
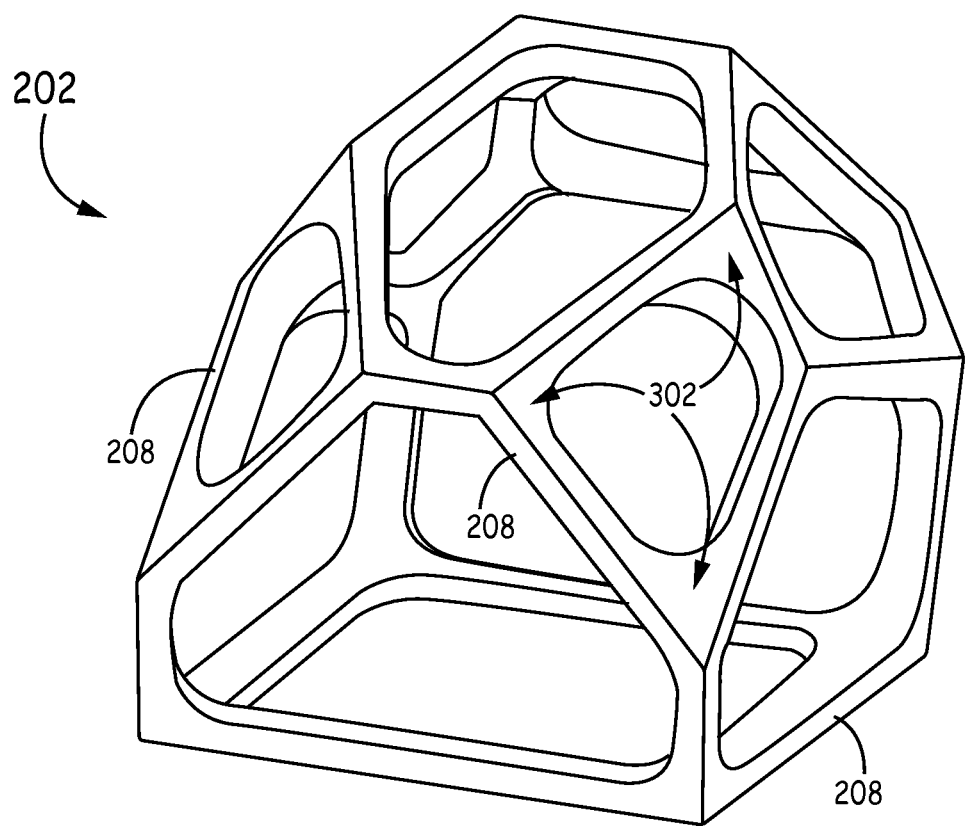
FIG. 3 is a perspective view of an example of a frame for the physics package of FIG. 2.

FIGS. 2A and 2B illustrate an example of the physics package 110 of the atomic sensor apparatus 100. FIG. 2A is a perspective view and FIG. 2B is an exploded view. As shown, the physics package 110 comprises a frame 202, a plurality of panes 204, and one or more chamber evacuation structures 206. FIG. 3 is a perspective view of an example frame 202. The frame 202 comprises a rigid structure including a plurality of slender support members 208 extending between one another in a three-dimensional structure. The frame 202 surrounds the vacuum chamber and provides the structure to hold the physical exterior of the vacuum chamber (e.g., the panes 204) in place to form the vacuum chamber. The slender support members 208 are slender in that they have a width that is small in proportion to their length. For example, the slender support members 208 can have a width that is at least half their length. The plurality of slender support members 208 can extend between one other such that the plurality of slender support members 208 are joined together to form a singled three-dimensional structure. The frame 202 defines a plurality of apertures around the exterior thereof. The slender support members 208 extend along the boundaries between adjacent apertures. Thus, the slender support members 208 at least partially define some or all of the apertures defined in the frame 202.

The frame 202 provides a structural framework for the plurality of panes 204. That is, the frame 202 acts as the structure to which other components (e.g., the panes 204) are attached and defines the physical relationship between the components when attached. The plurality of panes 204 are attached to the frame 202 to enclose and define the vacuum chamber. As such, the plurality of panes 204 are attached to cover some or all of the apertures 202 in the exterior of the frame 202 to form a physical shell around the vacuum chamber. The frame 202 includes a plurality of mounting surfaces 302 to which the panes 204 are attached. FIGS. 2A, 2B, and 3 illustrate an example where the mounting surfaces 302 are on an exterior of the frame 202 such that the frame 202 acts as skeleton with the panes 204 attached on the exterior of the frame 202. In an alternative example, the mounting surfaces are on an interior of the frame 202 such that the frame 202 acts an exoskeleton with the panes 204 attached on the interior thereof.

In an example, the frame 202 is a monolithic structure. That is, all of the slender support members 206 are formed together as a single integral structure. Some implementations of forming the monolithic structure of the frame 202 can also include forming other members along with the slender support members 206, such as the chamber evacuation structure 206. In such implementations, the support members 206 and the other members (e.g., the chamber evacuation structure 206) are formed together as a single integral structure. In other implementations of the monolithic structure, the slender support members 206 of the frame 202 are formed as a single integral structure (comprising the monolithic structure) separate from the other members such as a plate and/or the chamber evacuation structure 206. In such other implementations, the other members (e.g., the chamber evacuation structure 206) are attached to the monolithic structure and forming such. In yet other examples, the frame 202 is formed of multiple pieces (e.g., multiple slender support structures) that are connected together to form the frame 202. In an example, the frame 202 is composed of metal, and in particular is composed of a non-magnetic metal such as titanium.

In the example shown in FIGS. 2A, 2B, and 3, the physics package 110 and frame 202 have a geometry that includes a plurality of planar faces oriented at different angles about the exterior thereof. The planar faces are formed by the panes 204 attached to the frame 202. The exterior and interior shapes of the physics package 110 are defined by the frame 202 and the panes 204 attached thereto. The frame 202 defines the basic shape of the physics package 110 and the panes 204 attached to the frame 202 complete the surfaces of the shape. The interior surfaces of the panes 204 and the frame 202 define the shape of the vacuum chamber. In the example shown in FIGS. 2A, 2B, and 3, the panes 204 are generally planar structures having flat interior and exterior surfaces, and the frame 202 includes correspondingly flat and aligned mounting surfaces 302 for attachment of the panes 204. In other examples, one or more of the panes 204 can have other geometries (e.g., concave or convex) and the mounting surfaces 302 on the frame 202 can correspond to the geometry of the panes 204. In the example shown in FIGS. 2A, 2B, and 3, each pane 204 forms substantially all of its corresponding face on the physics package 110. As such, each pane 204 is attached to its respective mounting surface(s) 302 on the frame 202 at the edges of the pane 204. The slender support members 208 are disposed on the edges of each pane 204 and at corners in the geometry of the physics package 110. That is, the frame 202, and in particular the slender support members 208, defines the geometry of the physics package 110 by defining the corners of the multi-faced geometry and by providing mounting surfaces 302 such that the panes 204 can be attached thereto at their edges to form the faces of multi-faced geometry. Adjacent panes 204 are oriented at an angle with respect to one another and form adjacent faces of the physics package 110.

The plurality of panes 204 can include optically transmissive panes and optically reflective panes. The transmissive panes are configured to transmit light (e.g., from laser(s) 170 or to a detector) into and/or out of the vacuum chamber. The reflective panes are configured to reflect a light beam that is propagating in the vacuum chamber. The placement and orientation of the panes 204 is configured to provide the desired light paths within the vacuum chamber.

For example, the placement and orientation of the panes 204 can be configured to provide three light paths that cross within the vacuum chamber of the physics package 110 at approximately ninety (90) degree angles with respect to one another. Thus, the three light paths form three paths that are normal to each other and intersect within the physics package 110. The light beams used to cool the atoms can be propagated down these three light paths. In other examples, light paths used to cool the atoms or other light paths can be at angles other than approximately ninety (90) degrees and can intersect the same volume (and therefore the atom cloud) within the physics package 110. Some of the other light paths can be used for interrogation of the atoms.

In an example, the placement and orientation of the panes 204 can be configured to provide the desired light paths and/or the desired flexibility in light path options. For example, a first transmissive pane can be configured to transmit the input light beam from a laser 170. Several reflective panes can then be positioned and oriented to reflect the input light beam around the inside of the vacuum chamber such that the input light beam propagates along desired light paths (e.g., three light paths that intersect at approximately 90 degrees within the vacuum chamber). In one implementation of such an example, the single input light beam is reflected to propagate along the three light paths and, after propagating along three light paths, is retro-reflected backwards along the three light paths to exit the vacuum chamber by transmitting through the first transmissive pane. In other examples, more than one light beam can be used and other light paths can be used that do no intersect at 90 degrees. One or more transmissive panes can also be positioned such that fluorescence light from the atoms being interrogated can propagate from the atoms and transmit through the one or more transmissive panes to be sensed by a detector outside of the physics package 110. As described above, such a physics package 110 can accommodate multiple light paths which is advantageous for its flexibility to a multitude of sensor operations.

In an example, the panes 204 are composed of an optically transparent material and the reflective panes have a reflective coating on the optically transparent material. In an example, the optically transparent material is a glass, such as a glass-ceramic (e.g., Zerodur®) or an optical glass (e.g., BK-7), or other transparent material such as sapphire. In general a pane 204 should have the following properties: be vacuum tight, non-permeable to hydrogen or helium, non-reactive with the material to be introduced into the vacuum chamber, and, for transmissive panes, be low loss at the wavelength of interest. Other properties include low permeability to inert gases, such as Argon, and compatibility with frit bonding. In some examples, a pane 204 can be composed of a permeable material (or non-permeable material) that is enhanced with a non-permeable coating that, for example, does not alter the optical properties of the pane 204. In some examples some or all of the panes 204 that are not used as transmissive panes (e.g., the reflective panes) are composed of a non-optically transparent material such as MACOR®. In some examples, the reflective panes can be composed of a material that is optically reflective or has an optically reflective coating thereon. In examples using a reflective coating, the reflective coating can include a single or multilayer metal or dielectric stack coating. The reflective surfaces of the reflective panes can be planar or curved to slightly focus a beam of light as necessary. The panes 204 can be attached to the frame 202 using a frit seal, brazing, or other suitable attachment mechanism. Some examples of the physics package 110 can include a gettering material within the vacuum sealed chamber to limit the partial pressures of some gasses (e.g., hydrogen). For example, a getter film can be applied, via sputtering or sintering, to an interior surface of the panes 204 that is not used as a reflective or transmissive surface before assembly. Such a getter can be activated after assembly, using proper activation temperature material, by laser heating from the outside of the physics package 110. Individual coatings, whether getter film, reflective, permeation prevention and/or other, can be applied to individual panes 204. In some examples, other optics can be included in the physics package 110 (e.g., in or on a pane 204) such as a quarter wave plate or a polarization optic.

As mentioned above, the physics package 110 can include one or more chamber evacuation structures 206. A chamber evacuation structure 206 is a tubelike structure that provides an opening into the vacuum chamber. Such a chamber evacuation structure 206 can be used to perform initial evacuation of the vacuum chamber to ultra-high vacuum conditions. Depending on the sensor requirements, a vacuum pressure on the order of approximately 10 to the −7 to 10 to the −8 torr is acceptable. After evacuation of the vacuum chamber, the chamber evacuation structure 206 can be closed off to seal the vacuum chamber. In an example, the chamber evacuation structure 206 can be closed off by pinching the chamber evacuation structure 206. In an example, the chamber evacuation structure 206 is an integral portion of the frame 202 and formed (e.g., by machining) during formation of the frame 202. In other examples, the chamber evacuation structure 206 is formed separately from the frame 202 and attached to the frame 202 using a frit seal, brazing or other attachment mechanism. In an implementation of such an example, the chamber evacuation structure 206 can include a flange for attachment to the frame 202. Similar to the panes 204, the flange of the chamber evacuation structure 206 can be generally planar and can have a shape that matches a planar face of the frame 202 when attached thereto. Such a flange is illustrated in FIG. 3 and can attach to mounting surfaces 302 on one or more slender support members 208.

In some examples, a sample reservoir can be attached to the physics package 110 over an aperture, such as an aperture defined in a plate of the frame 202. The sample contained can hold an alkali sample used to release atoms into the vacuum chamber for interrogation in the physics package 110. The chamber evacuation structure 206 and sample reservoir can also serve as electrodes for forming a plasma for discharge cleaning of the physics package 110 and to enhance pump down and bake out.

In some examples, the support members 208 are made up of members that define an interior corner for placement of a pane 204 therein. A pane 204 can be placed in the corner such that it abuts the members defining the corner. In an example, the corner is defined by a lateral member that extends along the support member 208 and is disposed adjacent a pane 204 (when attached) and between the edges of adjacent panes 204.

The corner is also defined by a mounting member that extends from the lateral member to form the corner therebetween. In an example, the mounting member extends at approximately a 90 degree angle from the lateral member to form a generally right angle corner. The mounting member extends from the lateral member towards the corresponding aperture that is at least partially defined by the mounting member. In the example shown in FIG. 3, the mounting surfaces on the support members 208 are surfaces on the mounting members. In particular, the mounting surfaces 302 are the surfaces of the mounting members that form the corner with the lateral member. As such, a pane 204 can be attached to the mounting surface 302 in the corner formed by the lateral member and the mounting member. In other examples, the support members 208 can have other geometries, such as rectangular. Moreover, in some examples the mounting surface 302 can be a surface that is not part of an interior corner. An implementation of such an example is shown in FIG. 3.

Figure 4:
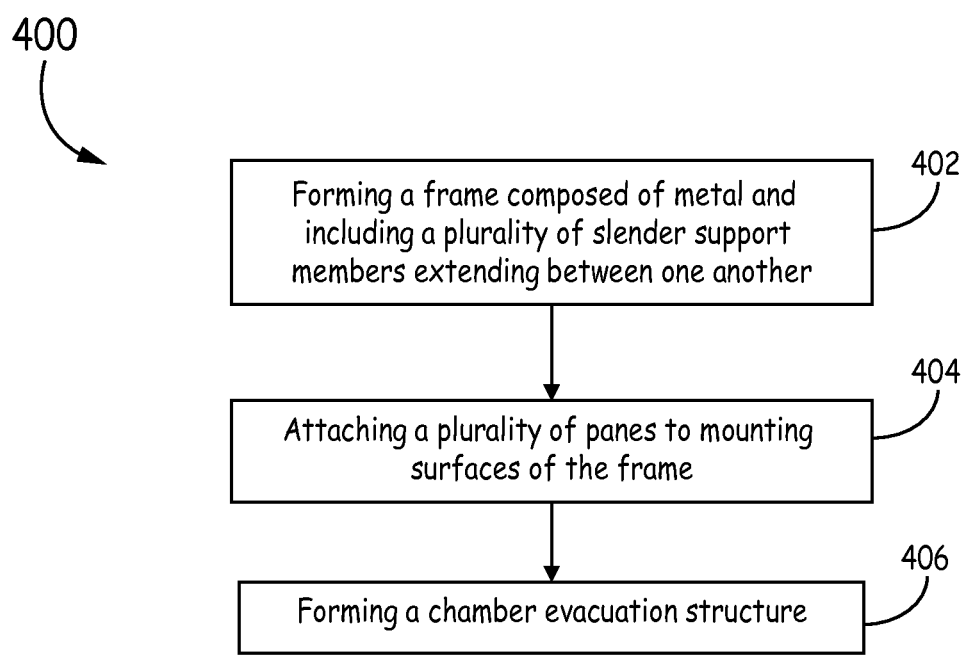
FIG. 4 is a flow chart of an example method of forming a physics package of the atomic sensor apparatus of FIG. 1, the physics package comprising a frame with a plurality of panes attached thereto.

FIG. 4 is a flow chart of an example method 400 of forming a physics package 110 for an atomic sensor apparatus 100. To form the physics package 110, the frame 202 is formed (block 402). Forming the frame 202 includes forming the slender support members 208, and in examples where other structures are integral with the frame 202 includes forming such other structures (e.g., the chamber evacuation structure 206). In examples where the frame 202 is a monolithic structure, the slender support members 206 along with any other members that are part of the monolithic structure can be formed by casting or 3D printing a single integral structure, or can be formed by machining a monolithic block into the desired geometry comprising the slender support members 206 and any other members that are a part of the monolithic structure. In examples where the frame 202 is formed by connecting together multiple pieces, each piece comprising portions of one or more slender support members 206, each piece can be formed by casting, machining, or other process and, once formed, can be attached together by welding, frit sealing, vacuum brazing, or other mechanism. Any process of forming the slender support members 206 can include forming the mounting surfaces, such as by forming the lateral members and the mounting members.

Once the frame 202 is formed, the plurality of panes 204 are attached to the frame 202 (block 404). In an example, the panes 204 can be formed having a shape that matches the planar face defined by the frame 202 to which the particular pane 204 is to be attached. The panes 204 can be attached to the frame 202 using any suitable process such as by frit sealing or vacuum brazing. In some implementations of examples where the panes 204 are on the interior of the frame 202 and the frame 202 is formed of multiple pieces, the panes 204 can be attached to the pieces (e.g., halves) of the frame 202 prior to the pieces being connected together. After attaching the panes 204 to the interior of the pieces, the pieces can be connected together as discussed above to form the frame 202. In some examples, an adhesion promoting thin film can be placed on the panes 204 and/or frame 202.

The panes 204 are attached to the frame 202 in a manner that achieves a vacuum tight seal between the panes 204 and the frame 202. The panes 204 by attaching the panes 204 to mounting surfaces on the frame 202 to cover apertures in the frame 204 and form the vacuum chamber. Appropriate panes 204 (e.g., optically transmissive panes or optically reflective panes) can be placed in appropriate positions on the frame 202 to achieve the desired light paths in the vacuum chamber. In some examples, the optically reflective panes can be coated with a reflective coating (e.g., on the to-be interior side) prior to being attached to the frame 202.

The chamber evacuation structure 206 can also be formed. In examples where the chamber evacuation structure 206 is part of a monolithic structure including the slender support members 208, the chamber evacuation structure 206 can be formed by casting or machining in the same process that forms the slender support members 206. In examples, where the chamber evacuation structure 206 is formed separately from the frame 202 including the slender support members 206, the separate chamber evacuation structure 206 can be formed by casting, machining, or by other appropriate process and attached to the frame 202 over an aperture therein using a frit seal, brazing, or other appropriate process. The chamber evacuation structure 206 is attached to the frame 202 in a manner that achieves a vacuum tight seal between the chamber evacuation structure and the frame 202. Forming the separate chamber evacuation structure 206 can include forming the tubelike portion of the chamber evacuation structure 206 and a flange to be attached to the frame 202. In an implementation of such an example, the flange can be formed to have a shape matching planar face defined by the frame 202 to which the flange is to be attached. Other members can also be attached to the frame such as a sample reservoir as discussed above.

EXAMPLE EMBODIMENTS

Example 1

Includes a physics package of an atomic sensor, the physics package comprising: a frame composed of metal and including a plurality of slender support members extending between one another in a three dimensional structure, the support members defining boundaries between adjacent apertures defined in the frame, the plurality of support members including a plurality of mounting surfaces adjacent to the apertures; a plurality of panes attached to the mounting surfaces of the frame, the plurality of panes covering the apertures such that the frame and the plurality of panes define a vacuum chamber and provide light paths for intersecting with an atom cloud within the vacuum chamber; and a chamber evacuation structure for evacuating the vacuum chamber.

Example 2

Includes the physics package of Example 1, wherein each of the plurality of support members includes: a lateral member disposed between adjacent panes of the plurality of panes; and a mounting member extending from the lateral member toward a corresponding aperture formed by the respective support member, wherein the mounting surfaces are surfaces on the mounting members; wherein the lateral member and the mounting member define a corner to which a corresponding pane of the plurality of panes abuts.

Example 3

Includes the physics package of any of Examples 1 or 2, wherein the plurality of mounting surfaces are on one of an interior or an exterior of the one or more mounting members.

Example 4

Includes the physics package of any of Examples 1-3, wherein the plurality of panes include one or more optically transparent panes and one or more optically reflective panes.

Example 5

Includes the physics package of Example 4, wherein the plurality of panes are oriented such that a beam of light entering the vacuum chamber through a first optically transparent pane is reflected at angles off of the one or more reflective panes to form three light paths that cross within the vacuum chamber at 90 degrees with respect to one another.

Example 6

Includes the physics package of any of Examples 1-5, wherein the plurality of panes are composed of glass, glass-ceramic, optical glass, or sapphire.

Example 7

Includes the physics package of any of Examples 1-6, wherein the chamber evacuation structure is attached to or is integral with the frame; the physics package further comprising: a sample reservoir attached to an aperture defined by the frame.

Example 8

Includes the physics package of any of Examples 1-7, wherein the plurality of panes are attached to the plurality of mounting surfaces with a frit seal or by vacuum brazing.

Example 9

Includes a method of forming a physics package, the method comprising: forming a frame composed of metal and including a plurality of slender support members extending between one another in a three dimensional structure, the support members defining boundaries between adjacent apertures defined in the frame, the plurality of support members including a plurality of mounting surfaces adjacent to the apertures; attaching a plurality of panes to the mounting surfaces of the frame, the plurality of panes covering the apertures such that the frame and the plurality of panes define a vacuum chamber and provide light paths for intersecting with an atom cloud within the vacuum chamber; and forming a chamber evacuation structure for evacuating the vacuum chamber.

Example 10

Includes the method of Example 9, wherein forming a frame includes forming each of the plurality of narrow support members by: forming a lateral member configured to be disposed between adjacent panes of the plurality of panes; and forming a mounting member extending from the lateral member toward a corresponding aperture defined by the support member, wherein the mounting surfaces are surfaces on the respective mounting member.

Example 11

Includes the method of Example 10, wherein attaching the plurality of panes includes attaching each pane to an interior surface or an exterior surface of the corresponding one or more mounting members.

Example 12

Includes the method of any of Examples 9-11, wherein forming a frame includes one of: machining a monolithic block of metal into the frame; or machining multiple blocks of metal into multiple portions of the frame and attaching together the multiple portions of the frame.

Example 13

Includes the method of any of Examples 9-12, wherein forming a vacuum evacuation structure includes: machining a portion of metal integral with the frame to form the chamber evacuation structure.

Example 14

Includes the method of any of Examples 9-13, comprising: attaching a chamber evacuation structure to the frame.

Example 15

Includes the method of any of Examples 9-14, comprising: attaching a sample reservoir to an aperture formed in the frame.

Example 16

Includes the method of any of Examples 9-15, wherein the plurality of panes include one or more optically transparent panes and one or more reflective panes, and the method includes placing a reflective coating on the one or more reflective panes prior to attaching the one or more reflective panes to the mounting surfaces.

Example 17

Includes the method of Example 16, wherein the plurality of panes are oriented such that a beam of light entering the vacuum chamber through a first optically transparent pane is reflected at angles off of the one or more reflective panes to form three light paths that cross within the vacuum chamber at 90 degrees with respect to one another.

Example 18

Includes the method of any of Examples 9-17, wherein the plurality of panes are compose of glass, glass-ceramic, optical glass, or sapphire.

Example 19

Includes a physics package of an atomic sensor, the physics package including: a frame composed of metal and including a plurality of slender support members extending between one another in a three dimensional structure, the support members defining boundaries between adjacent apertures defined in the frame, the plurality of support members including a plurality of mounting surfaces adjacent to the apertures; a first plurality of panes of optically transparent material attached to a first subset of the mounting surfaces of the frame to cover a first subset of the apertures, wherein the first plurality of panes are composed of glass, glass-ceramic, optical glass, or sapphire; a second plurality of panes that are optically reflective attached to a second subset of the mounting surfaces to cover a second subset of the apertures, wherein the second plurality of panes are composed of glass, glass-ceramic, optical glass, or sapphire having a reflective coating; wherein the first plurality of panes, the second plurality of panes, and the frame define a vacuum chamber and provide light paths for intersecting with an atom cloud within the vacuum chamber, wherein the apertures covered by the first plurality of panes and the second plurality of panes are oriented such that a beam of light entering the vacuum chamber through a first pane of optically transparent material is reflected at angles off of the one or more panes that are optically reflective to form the light paths; and a chamber evacuation structure formed in a portion of metal integral with the frame.

Example 20

Includes the physics package of Example 19, wherein each of the plurality of support members includes: a lateral member disposed between adjacent panes; and a mounting member extending from the lateral member toward a corresponding aperture formed by the respective support member, wherein the mounting surfaces are surfaces on the mounting members; wherein lateral member and the mounting member define a corner to which a corresponding pane abuts.

What is claimed is:

1. A physics package of an atomic sensor, the physics package comprising:
   a frame composed of metal and including a plurality of slender support members extending between one another in a three dimensional structure, the support members defining boundaries between adjacent apertures defined in the frame, the plurality of support members including a plurality of mounting surfaces adjacent to the apertures;
   a plurality of panes attached to the mounting surfaces of the frame, the plurality of panes covering the apertures such that the frame and the plurality of panes define a vacuum chamber and provide light paths for intersecting with an atom cloud within the vacuum chamber; and
   a chamber evacuation structure for evacuating the vacuum chamber.

2. The physics package of claim 1, wherein each of the plurality of support members includes:
   a lateral member disposed between adjacent panes of the plurality of panes; and
   a mounting member extending from the lateral member toward a corresponding aperture formed by the respective support member, wherein the mounting surfaces are surfaces on the mounting members;
   wherein the lateral member and the mounting member define a corner to which a corresponding pane of the plurality of panes abuts.

3. The physics package of claim 1, wherein the plurality of mounting surfaces are on one of an interior or an exterior of the one or more mounting members.

4. The physics package of claim 1, wherein the plurality of panes include one or more optically transparent panes and one or more optically reflective panes.

5. The physics package of claim 4, wherein the plurality of panes are oriented such that a beam of light entering the vacuum chamber through a first optically transparent pane is reflected at angles off of the one or more reflective panes to form three light paths that cross within the vacuum chamber at 90 degrees with respect to one another.

6. The physics package of claim 1, wherein the plurality of panes are composed of glass, glass-ceramic, optical glass, or sapphire.

7. The physics package of claim 1, wherein the chamber evacuation structure is attached to or is integral with the frame; the physics package further comprising:
   a sample reservoir attached to an aperture defined by the frame.

8. The physics package of claim 1, wherein the plurality of panes are attached to the plurality of mounting surfaces with a frit seal or by vacuum brazing.

9. A method of forming a physics package, the method comprising:
   forming a frame composed of metal and including a plurality of slender support members extending between one another in a three dimensional structure, the support members defining boundaries between adjacent apertures defined in the frame, the plurality of support members including a plurality of mounting surfaces adjacent to the apertures;
   attaching a plurality of panes to the mounting surfaces of the frame, the plurality of panes covering the apertures such that the frame and the plurality of panes define a vacuum chamber and provide light paths for intersecting with an atom cloud within the vacuum chamber; and
   forming a chamber evacuation structure for evacuating the vacuum chamber.

10. The method of claim 9, wherein forming a frame includes forming each of the plurality of narrow support members by:
    forming a lateral member configured to be disposed between adjacent panes of the plurality of panes; and
    forming a mounting member extending from the lateral member toward a corresponding aperture defined by the support member, wherein the mounting surfaces are surfaces on the respective mounting member.

11. The method of claim 10, wherein attaching the plurality of panes includes attaching each pane to an interior surface or an exterior surface of the corresponding one or more mounting members.

12. The method of claim 9, wherein forming a frame includes one of:
    machining a monolithic block of metal into the frame; or
    machining multiple blocks of metal into multiple portions of the frame and attaching together the multiple portions of the frame.

13. The method of claim 9, wherein forming a vacuum evacuation structure includes:
    machining a portion of metal integral with the frame to form the chamber evacuation structure.

14. The method of claim 9, comprising:
    attaching a chamber evacuation structure to the frame.

15. The method of claim 9, comprising:
    attaching a sample reservoir to an aperture formed in the frame.

16. The method of claim 9, wherein the plurality of panes include one or more optically transparent panes and one or more reflective panes, and the method includes placing a reflective coating on the one or more reflective panes prior to attaching the one or more reflective panes to the mounting surfaces.

17. The method of claim 16, wherein the plurality of panes are oriented such that a beam of light entering the vacuum chamber through a first optically transparent pane is reflected at angles off of the one or more reflective panes to form three light paths that cross within the vacuum chamber at 90 degrees with respect to one another.

18. The method of claim 9, wherein the plurality of panes are compose of glass, glass-ceramic, optical glass, or sapphire.

19. A physics package of an atomic sensor, the physics package including:
    a frame composed of metal and including a plurality of slender support members extending between one another in a three dimensional structure, the support members defining boundaries between adjacent apertures defined in the frame, the plurality of support members including a plurality of mounting surfaces adjacent to the apertures;

a first plurality of panes of optically transparent material attached to a first subset of the mounting surfaces of the frame to cover a first subset of the apertures, wherein the first plurality of panes are composed of glass, glass-ceramic, optical glass, or sapphire;

a second plurality of panes that are optically reflective attached to a second subset of the mounting surfaces to cover a second subset of the apertures, wherein the second plurality of panes are composed of glass, glass-ceramic, optical glass, or sapphire having a reflective coating;

wherein the first plurality of panes, the second plurality of panes, and the frame define a vacuum chamber and provide light paths for intersecting with an atom cloud within the vacuum chamber, wherein the apertures covered by the first plurality of panes and the second plurality of panes are oriented such that a beam of light entering the vacuum chamber through a first pane of optically transparent material is reflected at angles off of the one or more panes that are optically reflective to form the light paths; and a chamber evacuation structure formed in a portion of metal integral with the frame.

20. The physics package of claim 19, wherein each of the plurality of support members includes:

a lateral member disposed between adjacent panes; and a mounting member extending from the lateral member toward a corresponding aperture formed by the respective support member, wherein the mounting surfaces are surfaces on the mounting members;

wherein lateral member and the mounting member define a corner to which a corresponding pane abuts.

* * * * *